United States Patent
Levesque et al.

(10) Patent No.: US 11,134,496 B2
(45) Date of Patent: Sep. 28, 2021

(54) AUTO-DETECTION OF AXC MAPPING WITHIN A CPRI LINK

(71) Applicant: EXFO INC., Quebec (CA)

(72) Inventors: Martin Levesque, Quebec (CA); Robert Matesevac, Wake Forest, NC (US); Eric Carignan, Laval (CA)

(73) Assignee: EXFO INC., Québec (CA)

( * ) Notice: Subject to any disclaimer, the term of this patent is extended or adjusted under 35 U.S.C. 154(b) by 303 days.

(21) Appl. No.: 16/543,962

(22) Filed: Aug. 19, 2019

(65) Prior Publication Data

US 2020/0068552 A1    Feb. 27, 2020

Related U.S. Application Data

(60) Provisional application No. 62/740,147, filed on Oct. 2, 2018, provisional application No. 62/720,202, filed on Aug. 21, 2018.

(51) Int. Cl.
*H04W 24/02* (2009.01)
*H04W 72/04* (2009.01)
(Continued)

(52) U.S. Cl.
CPC ...... *H04W 72/048* (2013.01); *H04B 10/0775* (2013.01); *H04B 10/25758* (2013.01);
(Continued)

(58) Field of Classification Search
CPC ........... H04W 72/048; H04W 72/0413; H04W 24/10; H04W 72/046; H04W 72/0446;
(Continued)

(56) References Cited

U.S. PATENT DOCUMENTS

| | | |
|---|---|---|
| 8,705,634 B2 | 4/2014 | Wegener |
| 8,934,561 B2 | 1/2015 | Fleming et al. |

(Continued)

OTHER PUBLICATIONS

CPRI Specification V7.0, Interface Specification, Oct. 9, 2015.
(Continued)

*Primary Examiner* — Edan Orgad
*Assistant Examiner* — Malick A Sohrab
(74) *Attorney, Agent, or Firm* — Clements Bernard Baratta; Lawrence A. Baratta, Jr.

(57) ABSTRACT

A device and method for providing a mapping of antenna data into antenna containers within a common public radio interface (CPRI) signal exchanged between a radio equipment controller (REC) and at least one radio equipment (RE) are described. The method comprises finding a location of activity within the multiple CPRI basic frames; extracting a candidate antenna signal from the multiple CPRI basic frames starting from the location using a set of mapping parameters used in a standard antenna signal; comparing a candidate frequency content of the candidate antenna signal to a standard frequency content of the standard antenna signal to derive a validity score; associating the set of mapping parameters of the standard antenna signal to the observed mapping if the validity score meets predetermined conditions; and causing a report of the observed mapping.

14 Claims, 18 Drawing Sheets

(51) Int. Cl.
*H04W 24/10* (2009.01)
*H04B 10/2575* (2013.01)
*H04B 10/077* (2013.01)

(52) U.S. Cl.
CPC ....... *H04W 24/10* (2013.01); *H04W 72/0413* (2013.01); *H04W 72/046* (2013.01); *H04W 72/0446* (2013.01); *H04W 72/0453* (2013.01)

(58) Field of Classification Search
CPC . H04W 72/0453; H04W 92/12; H04W 24/08; H04W 24/02; H04W 88/085; H04B 10/25758; H04B 10/0775
See application file for complete search history.

(56) References Cited

U.S. PATENT DOCUMENTS

| | | | |
|---|---|---|---|
| 9,184,842 B2 | 11/2015 | Dahlfort et al. | |
| 9,276,605 B2 | 3/2016 | Xia et al. | |
| 9,277,424 B2 | 3/2016 | Garcia | |
| 9,520,971 B2 | 12/2016 | Hao et al. | |
| 10,069,607 B2 | 9/2018 | Shor et al. | |
| 10,103,801 B2 | 10/2018 | Bennett et al. | |
| 10,170,821 B2 | 1/2019 | Persson et al. | |
| 10,237,765 B1 | 3/2019 | Bradley | |
| 2014/0198684 A1* | 7/2014 | Gravely | H04L 43/18 370/254 |
| 2015/0281983 A1* | 10/2015 | Garcia | H04W 56/001 370/252 |
| 2016/0277964 A1* | 9/2016 | Xu | H04L 12/1886 |
| 2017/0171088 A1* | 6/2017 | Shor | H04L 47/29 |
| 2018/0070254 A1* | 3/2018 | Hannan | H04B 17/0085 |
| 2018/0217265 A1* | 8/2018 | Pieroni | H04B 7/2125 |
| 2018/0270902 A1 | 9/2018 | Zhang et al. | |
| 2019/0370678 A1* | 12/2019 | Lee | G06N 7/005 |

OTHER PUBLICATIONS

CPRI Specification V4.2, Interface Specification, available at http://www.cpri.info/downloads/CPRI_v_4_2_2010-09-29.pdf, Sep. 29, 2010.

Anritsu Company; Anritsu Introduces CPRI RF Measurement Option That Dramatically Reduces Time and Cost Associated with Testing RRHs on 4G Networks, Network Weekly News, Jul. 11, 2016, p. 94, Atlanta, United States.

SharpLearning Machine, available at https://github.com/mdabros/SharpLearning, Aug. 21, 2018.

* cited by examiner

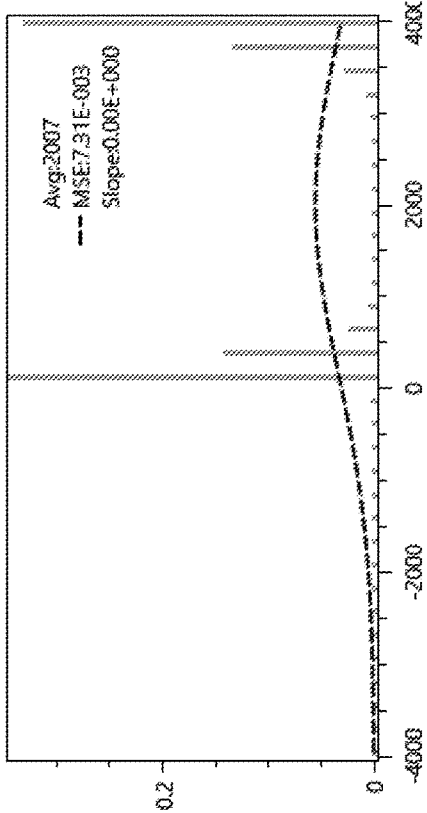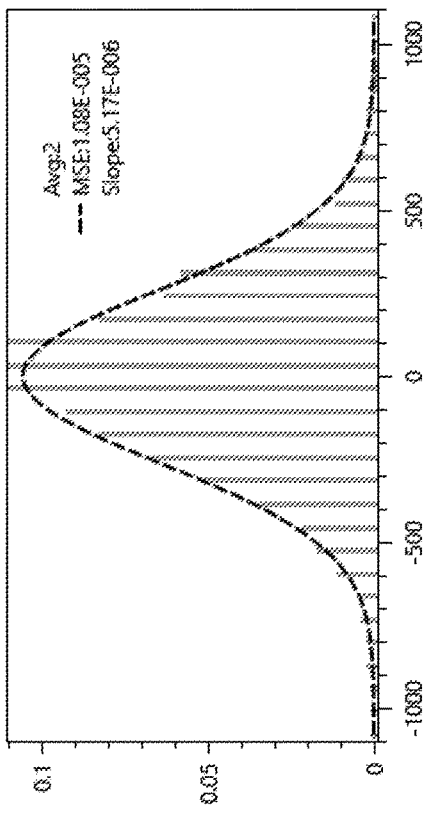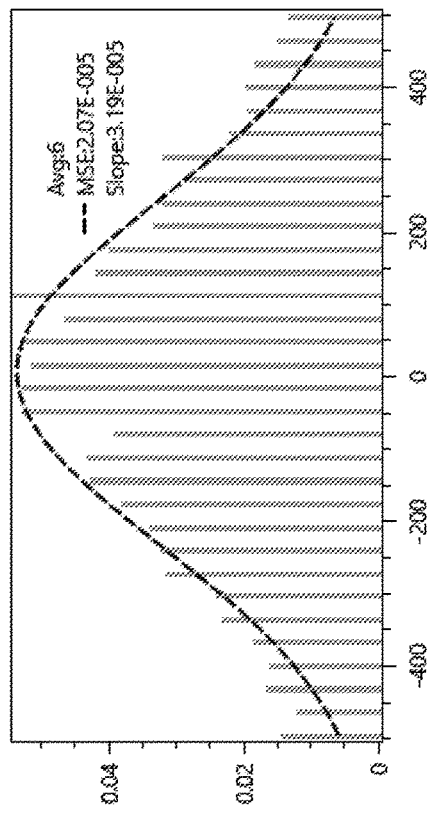
Figure 12A - 12/3 encoding
Figure 12B - 15/0 encoding
Figure 12C - 10/0 (non-standard) encoding
Figure 12

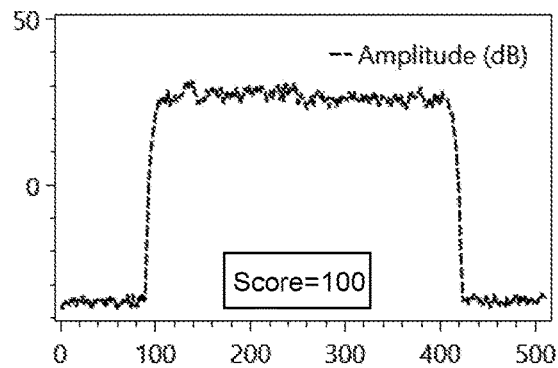
Fig. 16A - Oversample 2, 12/3 encoding
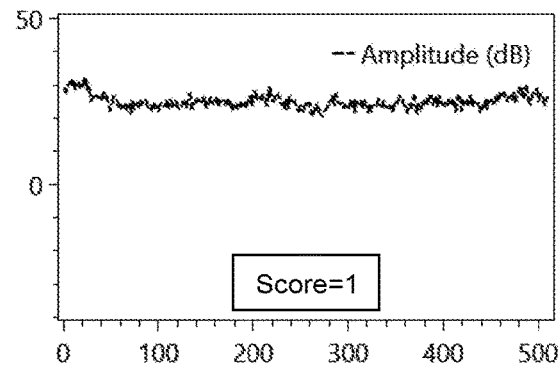
Fig. 16B - Oversample 1, 12/3 encoding
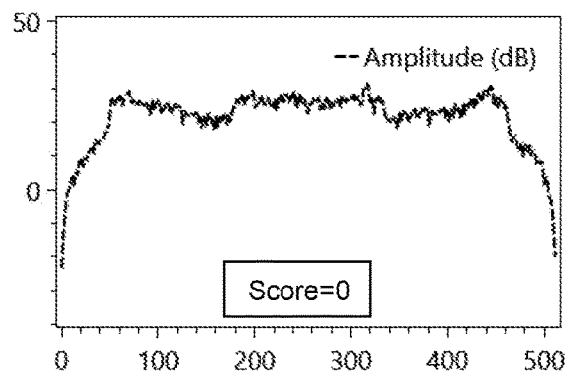
Fig. 16C - Oversample 4, 12/3 encoding
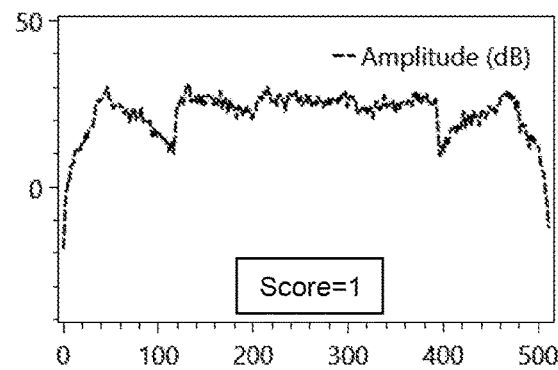
Fig. 16D - Oversample 6, 12/3 encoding
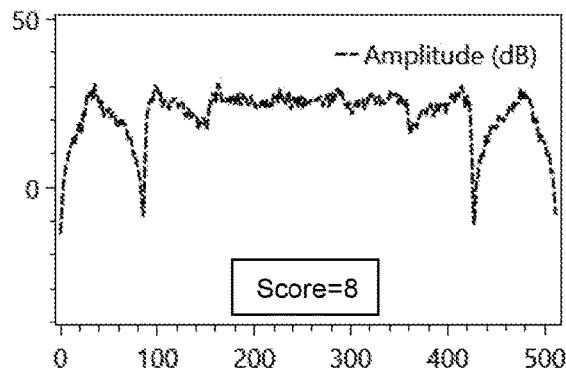
Fig. 16E - Oversample 8, 12/3 encoding
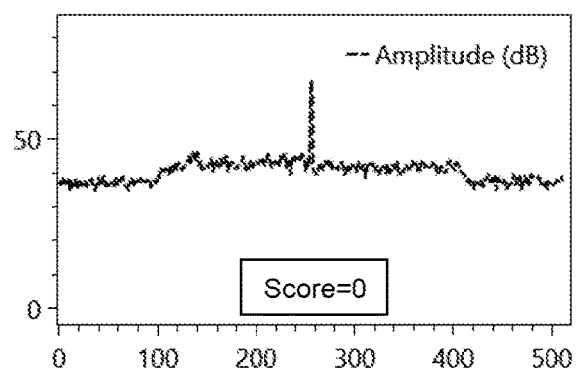
Fig. 16F - Oversample 2, 15/0 encoding

AUTO-DETECTION OF AXC MAPPING WITHIN A CPRI LINK

CROSS-REFERENCE TO RELATED APPLICATIONS

This application claims priority under 35 U.S.C. § 119(e) of U.S. provisional patent applications No. 62/720,202 filed Aug. 21, 2018 and No. 62/740,147 filed Oct. 2, 2018 which are hereby incorporated by reference.

TECHNICAL FIELD

The invention generally relates to network testing systems and methods. More particularly, it relates to the automated detection of the mapping of antenna container data into a data frame of a CPRI link for network test or monitoring equipment.

BACKGROUND

Previous generations of network elements for cellular networks were connected to antennas using coaxial wiring. The Common Public Radio Interface (CPRI) protocol allows replacing multiple coaxial interconnections by optical fiber. With CPRI, the network element is functionally split into a Radio Equipment Control unit (REC) and a Radio Equipment unit (RE) as shown in FIG. 1 (prior art). The REC is responsible for the generation and analysis of the RF signals. The RE is connected to multiple antennas and is responsible to transmit and receive the RF signals. The RF signals going to and coming from the RE are transported to the REC using an optical fiber. This allows longer possible distance between REC and antennas and provides for more economical installation and maintenance.

The CPRI standard defines how to transport data from multiple antennas over an optical fiber. It includes guidelines on how to map the antenna data into antenna containers (AxCs) within the CPRI data frame, but it does not impose a strict layout. Implementations can use any combinations of sample width (5 to 20 bits), encoding (2's complement or mantissa/exponent) and offset location within the frame. The protocol also supports flexible bandwidth allocation by allowing the concatenation of multiple, usually contiguous, samples.

Typical network equipment allocates evenly-spaced antenna containers of the same size, width and encoding. FIG. 2 (prior art) shows an example of a CPRI basic frame where all containers are of equal size and have the same parameters. Unused containers are simply filled with null IQ values. Within the test equipment, the containers are indexed by their numbers. With such a scheme, test and monitoring equipment can be configured using a limited set of preset combinations.

Network elements can now multiplex multiple CPRI fibers onto a single fiber. A simplified diagram of this multiplexing context is shown in FIG. 3 (prior art). The data extraction configuration no longer contains only antenna containers of the same size and parameters, and they can be located at various offsets within the frame. This non-homogeneous mapping of AxCs is referred to herein as mixed-mappings. FIG. 4 (prior art) illustrates a mixed-mapping layout that could result from multiplexing equipment. With such mixed-mappings, it is not possible to provide the user with a manageable list of preset combinations. The offset, width, encoding and bandwidth information must be specified for each AxCs within the frame. FIG. 5 (prior art) shows an example multiplexed stream. The transported signals may be of different bandwidth or data encoding. Also, there is no established convention on how to attribute signal location into the multiplexed stream.

US Patent Application Publication No. 2016/0277964 describes methods for multiplexing/demultiplexing CPRI data streams between a Radio Equipment Control unit (REC) and multiple Radio Equipment units (RE).

The mapping information is made available by the REC or RE through their proprietary management interfaces on their management network. However, independent test or network monitoring equipment typically only have physical access to the multiplexed fiber and not to the management interfaces of each manufacturer. The test or network monitoring system can tap on the optical fiber link between the RE and the REC, that is observe the optical fiber link using, for example, a splitter. A CPRI interface panel is sometimes available. It provides optical fiber connectivity to allow non-intrusive monitoring of the RF content on the optical fibers. In most cases, a splitter/combiner architecture needs to be inserted to allow the test equipment to access the optical fiber RF signal to perform RF analysis testing. The system can decode the digitized RF information on the CPRI link and graph its spectrum. When the CPRI link carries homogeneous antenna containers, i.e. containers of the same bandwidth (e.g. 10 MHz), most radio equipment units allocate evenly-spaced antenna containers of the same size. With such a scheme, data extraction can be configured using a limited set of combinations. When the equipment units multiplex the information from multiple RE together before sending it to the REC, the antenna bandwidths and sample encoding are no longer uniform. In order to extract information from individual antennas from the CPRI link, a mapping is needed. This mapping may change from site to site, leading to a lot of manual configuration.

In a test or network monitoring context, configuring the data extraction manually is complex, error-prone and time-consuming. There is a need to automatically determine the mapping from the signal, especially when mixed-mapping is used by the REC and the RE.

SUMMARY

The system and method use a raw capture of the CPRI data stream to configure the data extraction automatically for any mappings, including mixed-mappings. The method is for an auto-detection of AxC (antenna container) mappings within a CPRI link.

The system uses a raw capture of the bytes within the CPRI link to be mapped. An iterative process determines the most probable mapping using the antenna carrier content. The mapping comprises the following parameters for each AxCs: offset within the frame, sample width and encoding and oversample.

The solution includes a) capture CPRI data and delineate the frames, b) examine bit states of all frames to locate active AxCs, c) identify oversample, sample width and encoding.

According to one broad aspect of the present invention, there is provided a method for providing an observed mapping of antenna data into antenna containers. The method comprises: finding a location of activity within the multiple CPRI basic frames; extracting a candidate antenna signal from the multiple CPRI basic frames starting from the location using a set of mapping parameters used in a standard antenna signal; comparing a candidate frequency content of the candidate antenna signal to a standard frequency content of the standard antenna signal to derive a validity score; associating the set of mapping parameters of the standard antenna signal to the observed mapping if the validity score meets predetermined conditions; and causing a report of the observed mapping.

In one embodiment, the steps of extracting and comparing are repeated for a plurality of different sets of mapping parameters and corresponding ones of the standard antenna signal to derive a plurality of validity scores, and wherein the associating comprises choosing a highest validity score among the plurality of validity scores and determining a chosen set of mapping parameters corresponding to the highest validity score for the observed mapping.

In one embodiment, the predetermined conditions include a minimum threshold for the validity score.

In one embodiment, finding the location of activity comprises calculating bit state statistics on the multiple CPRI basic frames to identify the location.

In one embodiment, the predetermined conditions include a minimum threshold for the validity score and further comprising calculating bit state statistics on the multiple CPRI basic frames when the highest validity score is below the minimum threshold for the validity score to identify a next starting location for the finding the location.

In one embodiment, the parameters are a sample width, an offset, an encoding and an oversample wherein the sample width is a number of bits per sample, the offset is a location of data within the basic CPRI frames, the encoding is a transformation of numeric values into bits and the oversample is a number of samples per CPRI basic frame.

In one embodiment, the encoding is one of 2's complement encoding and mantissa/exponent encoding.

In one embodiment, comparing comprises calculating multiple FFTs on the content, calculating an average FFT from the multiple FFTs, calculating an input vector by preprocessing the average FFT and computing the score by inputting the input vector into a machine learning model trained to recognize proper frequency content.

In one embodiment, the input vector is a slope vector.

In one embodiment, associating the set of mapping parameters further comprises determining a bandwidth for the content of the multiple CPRI basic frames, wherein the bandwidth is related to the standard frequency content of the standard antenna signal.

In one embodiment, the associating parameters comprises assessing a similarity to a first bandwidth signal and determining a first bandwidth score, assessing a similarity to a second bandwidth signal and determining a second bandwidth score, selecting a highest scoring similarity assessment between the first bandwidth score and the second bandwidth score to determine the bandwidth.

According to another broad aspect of the present invention, there is provided a non-transitory computer-readable storage medium having computer readable code stored thereon for programming a test system to perform the steps of the method.

According to still another broad aspect of the present invention, there is provided a mapping detection device configured to provide an observed mapping of antenna data into antenna containers, the device comprising an auto-detection module for performing the steps of the method, a mapping memory for storing the observed mapping of the antenna data into the antenna containers; and a user interface to report the observed mapping.

According to another broad aspect of the present invention, there is provided a mapping detection test system configured to provide an observed mapping of antenna data into antenna containers, the test system comprising: a user interface; a processor; and memory storing instructions that, when executed, cause the processor to carry out the steps of the method and output the observed mapping via the user interface.

BRIEF DESCRIPTION OF THE DRAWINGS

A detailed description of example embodiments is provided below with reference to the accompanying drawings, in which like reference numbers are used to denote like system components/method steps, as appropriate and in which:

FIG. 12 includes FIG. 12A to FIG. 12C and shows the distribution of 5000 samples extracted using various parameters, including using the correct parameters (FIG. 12A) and using incorrect parameters (FIG. 12B and FIG. 12C);

FIG. 16 includes FIG. 16A to FIG. 16F and compares the spectrum shape and score of a valid spectrum (FIG. 16A) to those of improper extraction parameters in FIG. 16B to FIG. 16F;

DETAILED DESCRIPTION

Figure 1:
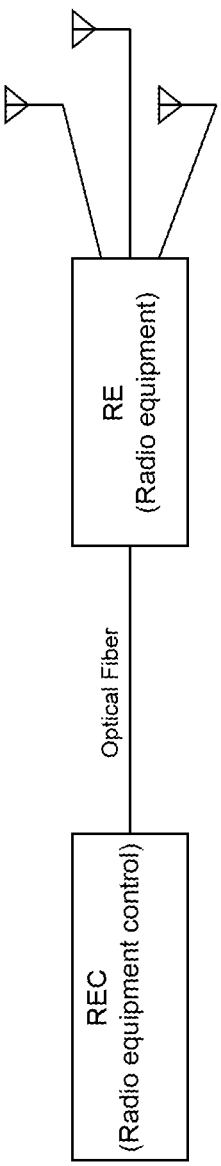
FIG. 1 (Prior Art) shows the typical optical fiber interconnection between a Radio Equipment Control (REC) and a Radio Equipment (RE)
Figure 2:
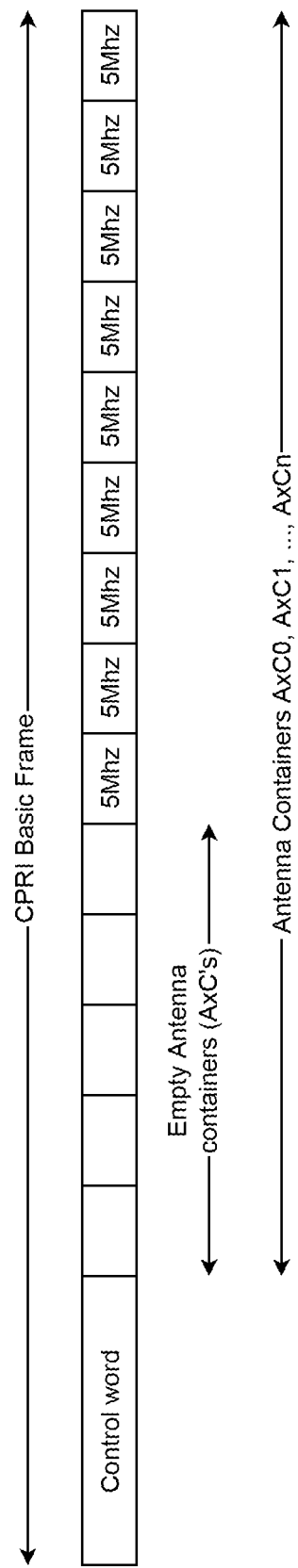
FIG. 2 (Prior Art) illustrates the structure of a CPRI basic frame with evenly-allocated, uniform antenna carriers (AxCs)
Figure 3:
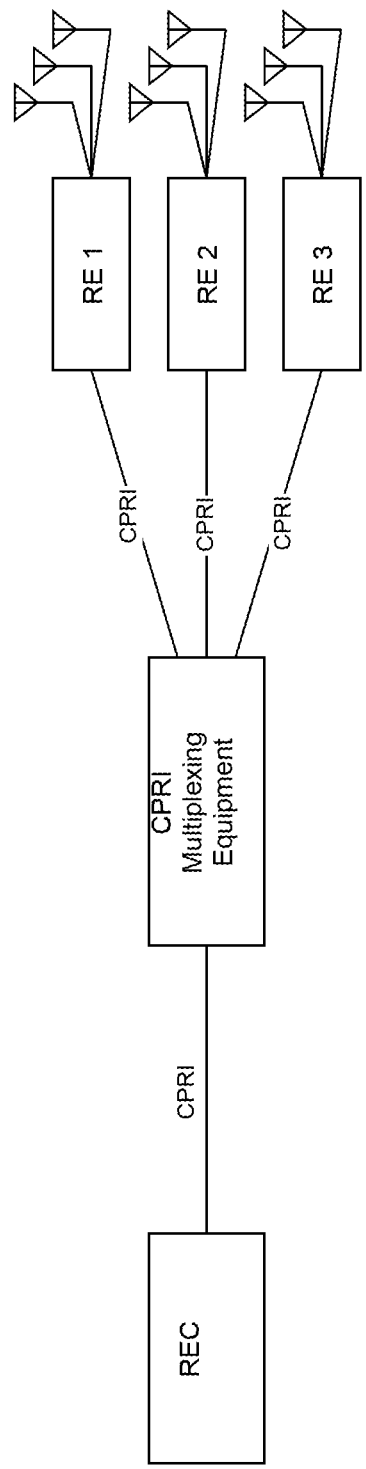
FIG. 3 (Prior Art) shows the interconnections between a REC and several REs through the use of a CPRI multiplexing equipment.
Figure 4:
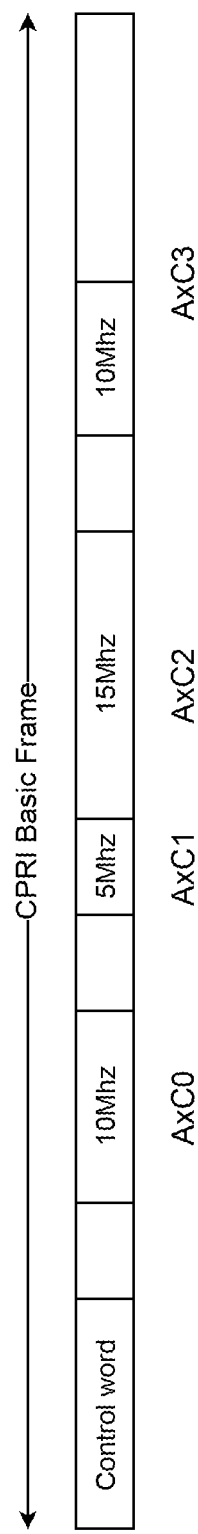
FIG. 4 (Prior Art) is an example of the structure of a CPRI frame containing a mixed mapping of antenna carriers.
Figure 5:
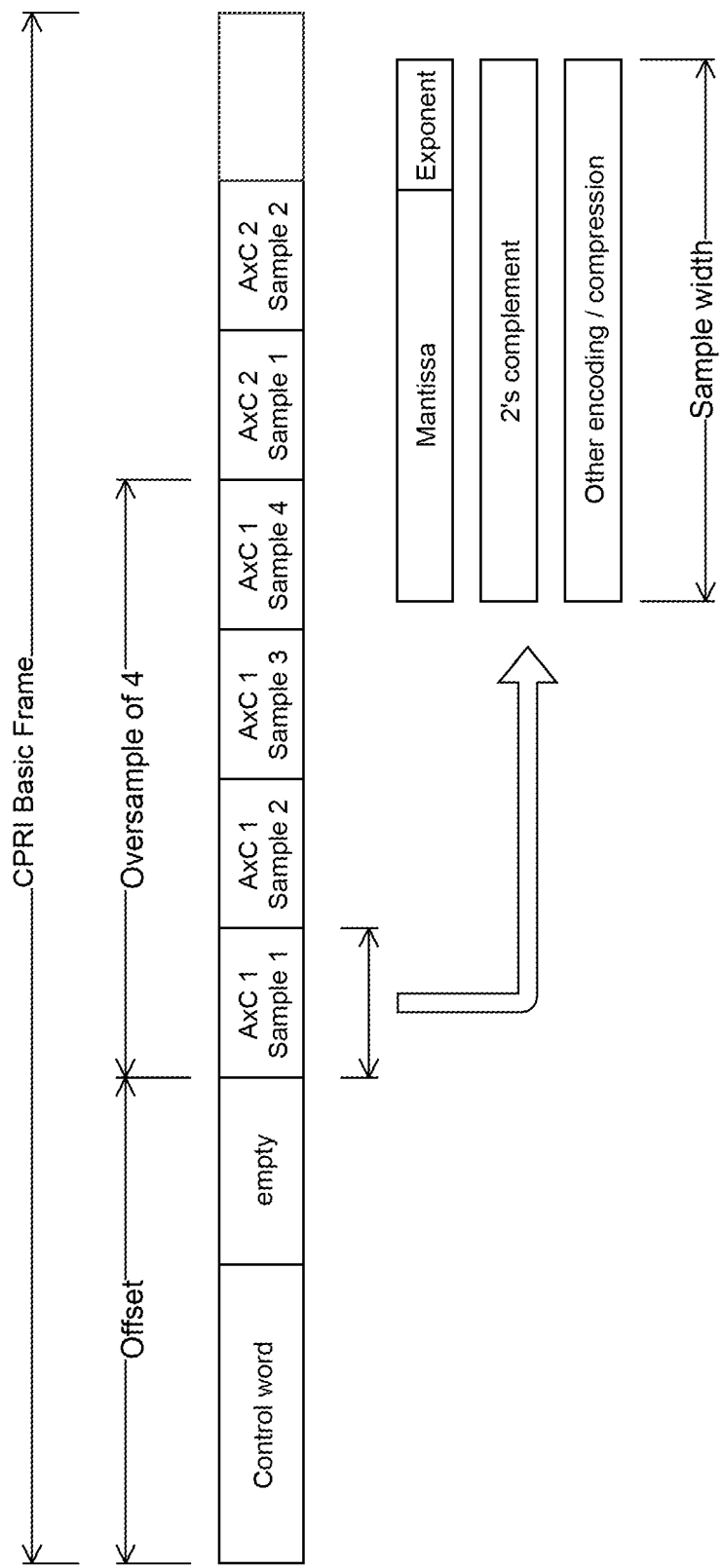
FIG. 5 (Prior Art) illustrates the extraction parameters of an antenna carrier.

The present system and method automatically detect the mapping of AxCs within a CPRI stream, which can be a multiplexed stream. The process relies on the analysis of the content of multiple CPRI basic frames. The analysis aims to determine the extraction parameters of each AxC through an iterative process. The parameters are: offset, or location of data within the frame, sample width and encoding (2's complement or mantissa/exponent), oversample and bandwidth (number of contiguous samples) and additional manufacturer specific parameters (e.g. compression scheme or samples spacing). FIG. 5 (prior art) illustrates the extraction parameters in an example multiplexed stream.

Figure 6:
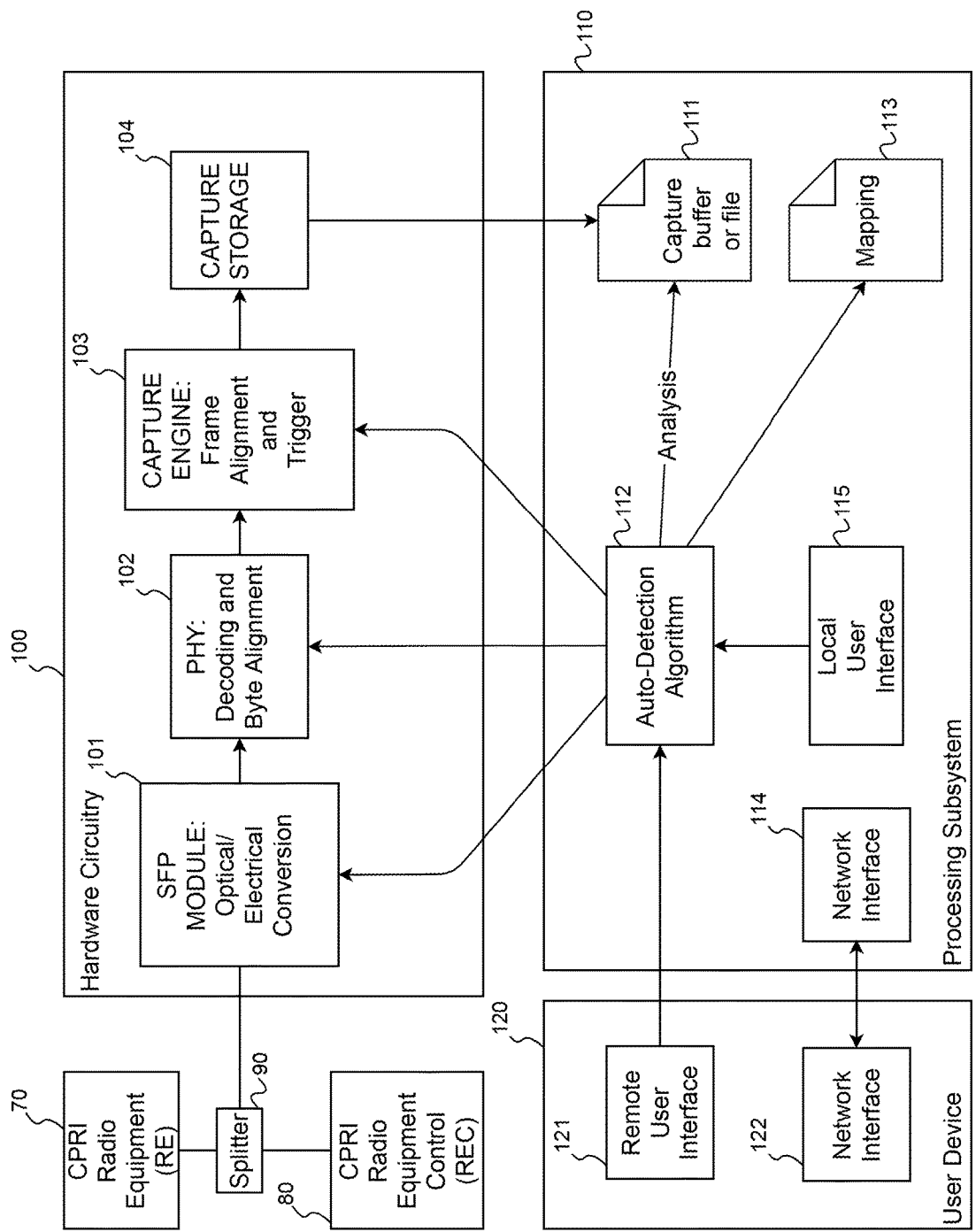
FIG. 6 is a block diagram showing main components of an example system for the auto-detection of the CPRI mapping.

FIG. 6 shows one example implementation that comprises Hardware Circuitry 100, Processing Subsystem 110 and optional user device 120. It should be appreciated by those of ordinary skill in the art that FIG. 6 depicts the system in an oversimplified manner, and a practical embodiment may include additional components and suitably configured processing logic to support known or convention operating features that are not described in detail herein. The Hardware circuitry 100 and the processing subsystem 110 are communicatively coupled via a local interface such as, for example, one or more buses or other wired or wireless connections, as is known in the art.

The Hardware Circuitry 100 can be any combination of off-the-shelf hardware components, e.g. a small form-factor pluggable (SFP) module and a field-programmable gate-array (FPGA) device. The Processing Subsystem 110 can be an embedded CPU subsystem or a general-purpose platform. Within the Processing Subsystem 110, functional components allow to carry out the RF analysis. The Auto-detection Algorithm 112 configures the hardware component for the received CPRI signal. Within the Hardware Circuitry 100, the SFP module 101 is adapted to connect to the CPRI link between the CPRI Radio Equipment (RE) 70 and the CPRI Radio Equipment Control (REC) 80 such as via splitter 90. For example, when the CPRI link is a fiber optic link, the SFP module 101 may include a detector which can be a receiver, i.e. a photodetector, that is configured to receive a signal for processing by the hardware circuitry 100.

The SFP module 101 converts optical signal to electrical signals. The physical unit (PHY) 102 implements bit-decoding (8B/10B or 64B/66B depending on the rate) as specified in the CPRI Specifications and provides a byte-aligned stream of data to the Capture Engine 103. The Capture Engine 103, once armed by the Auto-detection Algorithm 112, starts hunting for the particular sequence of bytes that indicates the start of a CPRI hyperframe. When the hyperframe is located, the Capture Engine 103 fills a Capture Storage 104. In an example embodiment, the Capture Storage 104 is a RAM memory which is located inside the FPGA for performance reasons. The captured content of the Capture Storage 104 is then transferred to a Capture Buffer or File 111. In another embodiment, the Capture Storage 104 could be directly offloaded to the Processing Subsystem 110. At that point the Auto-Detection Algorithm 112 can proceed with the analysis of the Capture File or Capture Buffer 111 stored in the Capture Storage 104 to determine the resulting Mapping 113.

The size of the Capture Storage 104 is dictated by the analysis that will be performed as described in following paragraphs. The process involves observing bit activity and computing multiple FFTs over multiple CPRI basic frames. Each basic frame typically contains 1, 2, 4, 6 or 8 IQ signal samples per antenna container, but equipment using 3 or 5 samples also exists. Assuming an FFT size of 256 frequency bands, one needs 512 IQ samples, or from 64 to 512 basic frames depending on the number of samples per frame. The size of CPRI basic frames depends on the rate of the signal (e.g. rate 7, or 9.8304 Gbps, has 256-bytes basic frames).

Using a rate-7 CPRI signal and 2 samples per frame, 64 Kbytes per FFT are needed. One requires multiple FFTs to average out some of the inherent noise of the resulting FFTs. For an averaging of 32 FFTs, one thus needs at least 2 Mbytes of storage. If more samples are needed, the storage can be enlarged, or multiple captures can be performed.

The processing subsystem 110 and the user device 120 can include a processor, memory, and a data store. The processor is a hardware device for executing software instructions. The processor may be any custom made or commercially available processor, a central processing unit (CPU), an auxiliary processor among several processors associated with the processing subsystem, a semiconductor-based microprocessor (in the form of a microchip or chip set), or generally any device for executing software instructions. When the system is in operation, the processing subsystem 110 is configured to execute software stored within the memory, to communicate data to and from the memory, and to generally control operations of hardware circuitry 100 pursuant to the software instructions. The memory and the data store in the processing subsystem 110 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical and/or other types of storage media. Note that the memory may have a distributed architecture, where various components are situated remotely from one another but can be accessed by the processing subsystem 110. The software in the memory may include one or more software programs, each of which includes an ordered listing of executable instructions for implementing logical functions for operation of the system. The software in the memory includes a suitable operating system and programs. The operating system essentially controls the execution of other computer programs, and provides scheduling, input-output control, file and data management, memory management and communication control and related services. The programs may be configured to implement the various processes, algorithms, methods, techniques, etc. described herein.

The system may further include a subsystems network interface 114 used to enable the processing subsystem 110 to communicate over a network, such as the Internet, a wide area network (WAN), a local area network (LAN), and the like, etc. The subsystem network interface 114 may include, for example, an Ethernet card or adapter or a wireless local area network (WLAN) card or adapter. The network interface may include address, control, and/or data connections to enable appropriate communications on the network.

Different ways to obtain user input and/or to provide system output are provided. A local User interface (UI) 115 can provide direct access to the auto-detection algorithm 112 within the processing sub-system. The local User interface 115 can be provided via a display device connected to the processing subsystem 110. A remote User interface (UI) 121 located on a user device 120 can also provide access to the auto-detection algorithm 112. User device 120 can be a laptop computer, desktop computer, server, mobile device, tablet, smartphone, etc. Local UI 115 and remote UI 121 are for interacting with the processing subsystem 110. The UI 115 and/or 121 may be used to receive user input from and/or for providing system output to one or more devices or components. The user input may be provided via, for example, a keyboard, touchpad and/or mouse. System output may be provided via a display device and a printer (not shown). User Device 120 can connect to the processing subsystem 110 via the subsystem network interface 114 and the user device network interface 122.

Figure 7:
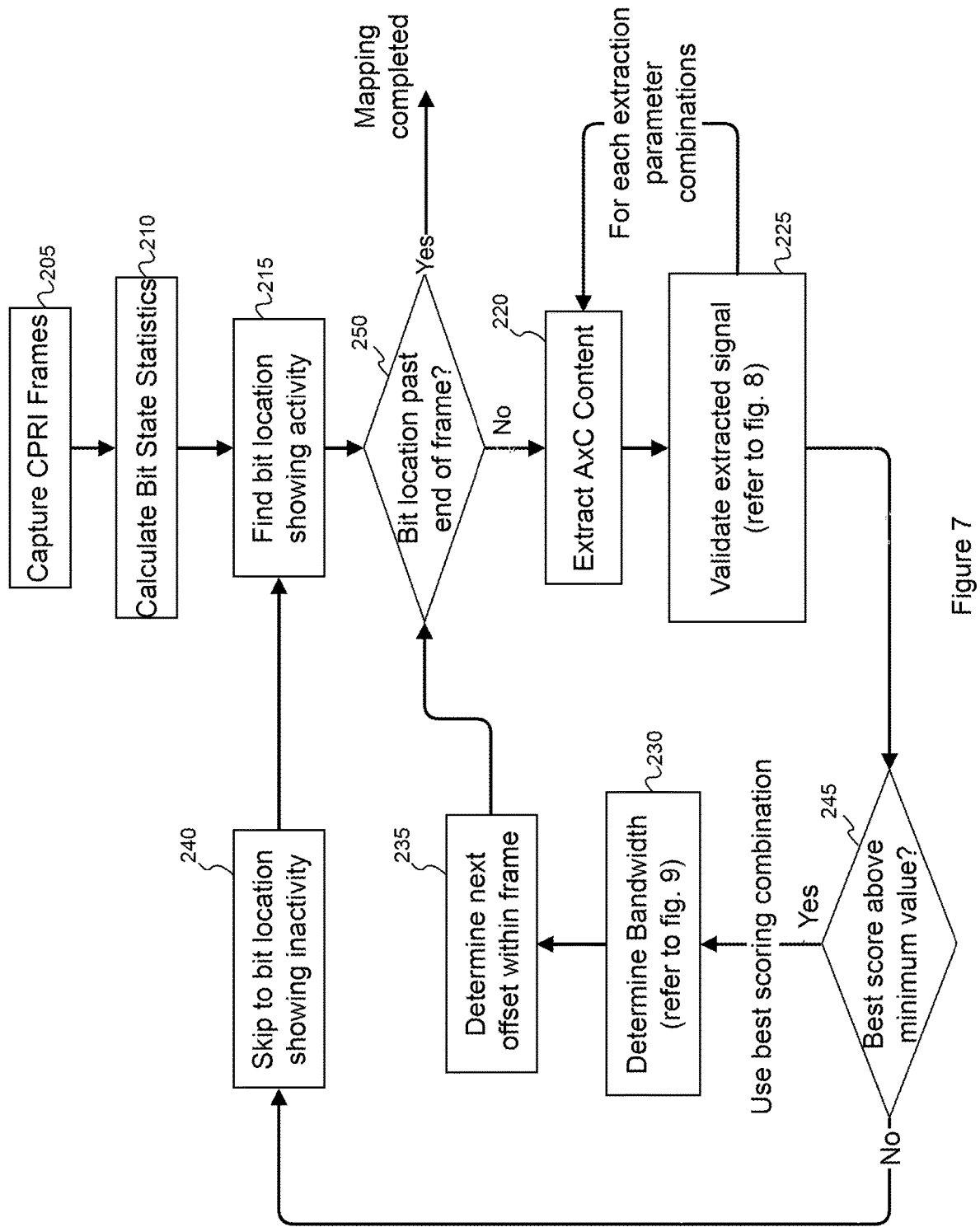
FIG. 7 is a flow chart showing main steps of an example algorithm for the auto-detection of CPRI mapping.
Figure 8:
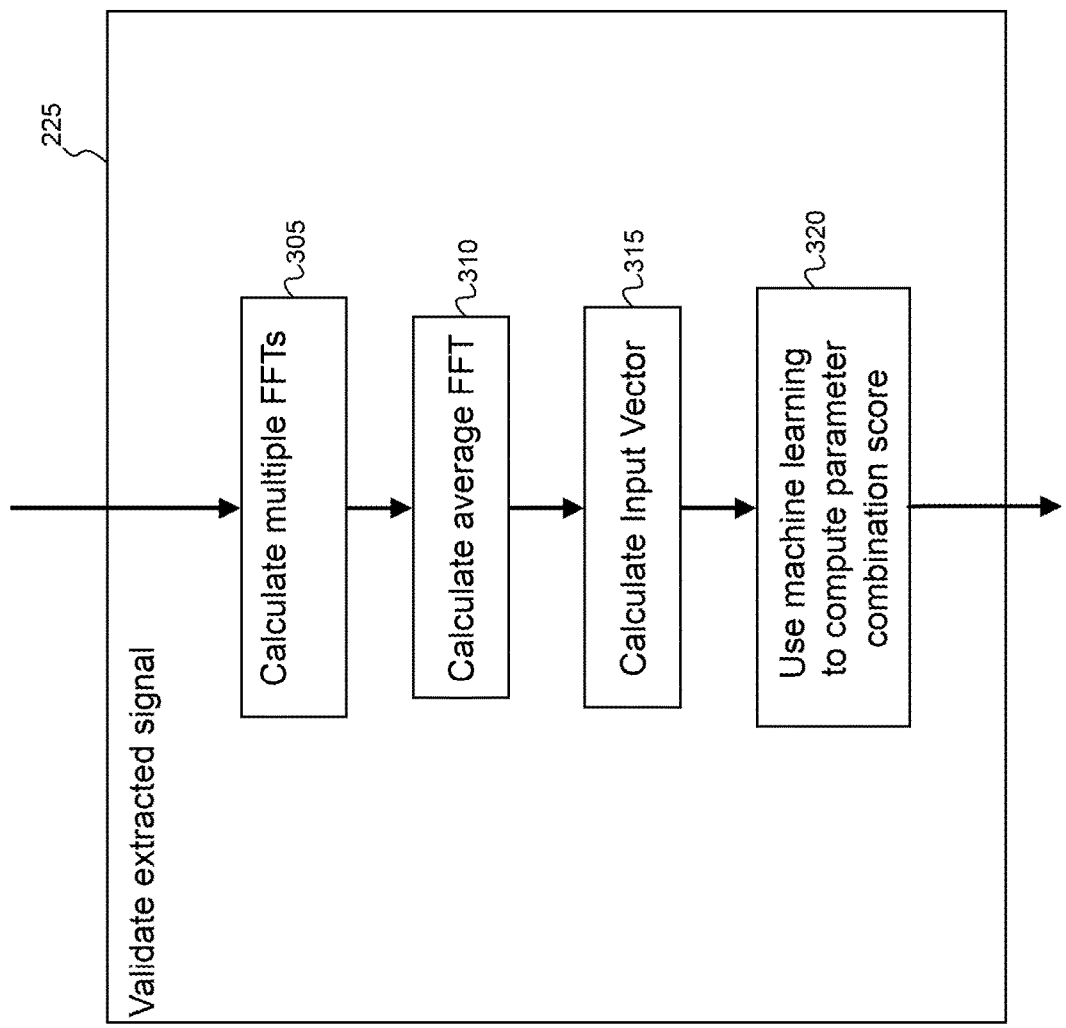
FIG. 8 is a flow chart showing details of an example extracted signal validation.
Figure 9:
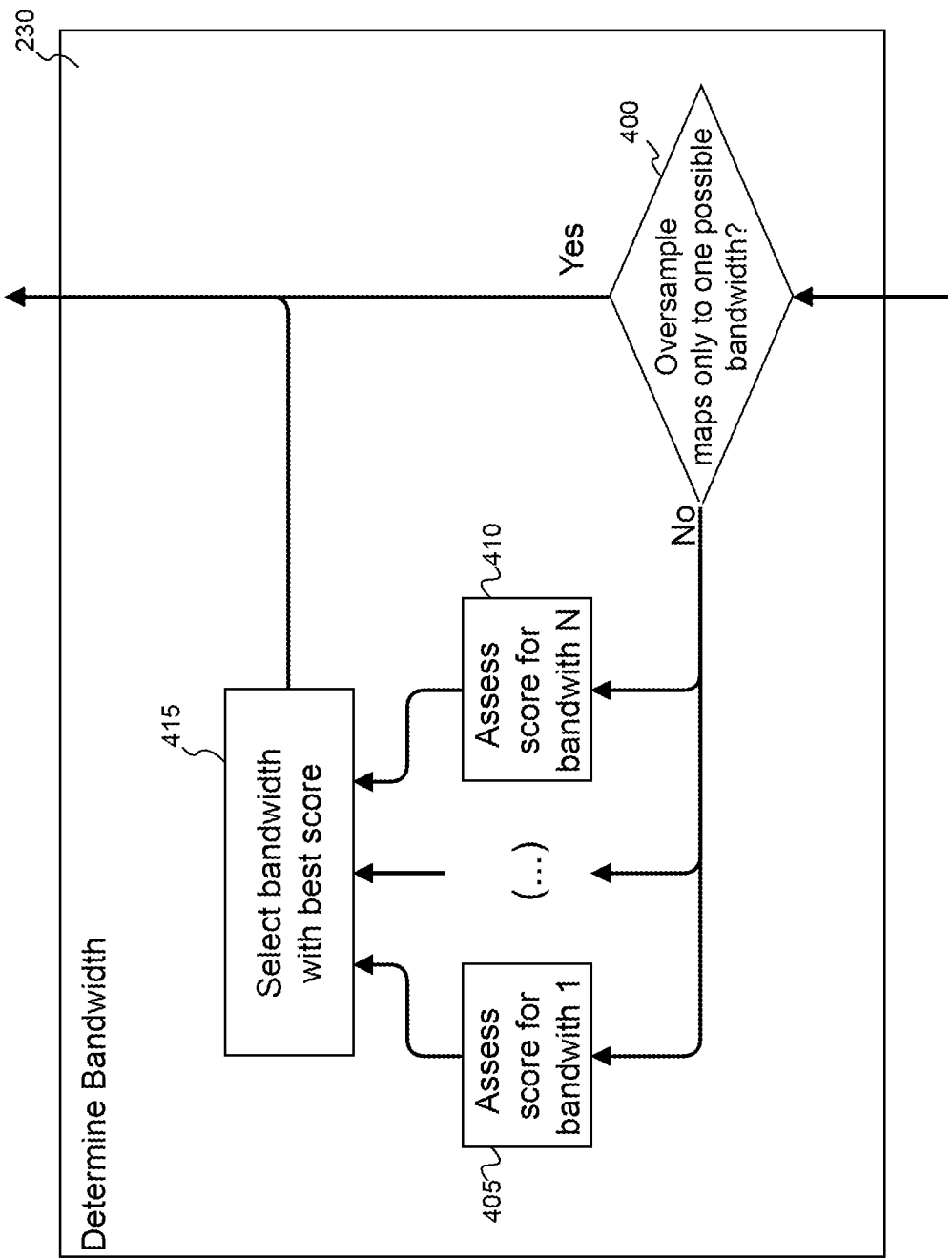
FIG. 9 is a flow chart showing example steps for the determination of the bandwidth for oversample 6.

The flowcharts in FIGS. 7 to 9 outline the processing involved in the auto-detection of the CPRI mapping. With reference to FIG. 7, once the data from the CPRI frames is available after step 205, step 210 calculates statistics on the bit states over the captured frames. The goal of this step is to find the location of the data samples within the frames. Optionally, this step can also provide information on the encoding of the samples. Using the bit statistics, step 215 of the algorithm finds the first bit location that shows activity. Starting from this location, the content of the antenna container is extracted in step 220 for a given combination of extraction parameters. Step 225 assesses the validity of the resulting candidate RF signal and assigns a score to the given parameter combination. Step 220 and 225 are repeated for all combinations of parameters. The highest score above a certain minimum value is selected as the correct extraction parameters for that bit location. The bandwidth is determined in step 230 and is covered in more details later. Since samples are contiguous in CPRI, step 235 can determine the next bit location by adding the oversample times the sample width to the current bit location. The process iterates from that new location until all the bit positions in the frame have been covered 250 and the process completes. When none of the scores are above the minimum score threshold 245, the algorithm has encountered an unknown mapping or a severely impaired signal. The auto-detection is failed for that bit location. In order to attempt detection on the subsequent samples, step 240 skips bit locations until it finds one that shows no activity. The algorithm proceeds to step 215 that skips inactive bits to locate the next sample.

The flowchart of FIG. 8 shows an implementation based on machine learning for step 225 in FIG. 7 (Validate extracted signal). The algorithm relies on the frequency content of the RF signal that is transported by the samples in the CPRI frames. When the correct parameters are used for signal extraction, a characteristic pattern of frequency content can be observed, whereas incorrect parameters yield abnormal patterns. Step 305 of FIG. 8 transforms the time-domain RF signal into the frequency-domain representation using the Fast-Fourier transform (FFT). Step 310 filters the frequency content, in this case by averaging together multiple FFTs. Preprocessing step 315 transforms the filtered frequency content into an appropriate input vector for the machine learning model. Step 320 applies the input vector to a machine learning model that was trained to recognize proper frequency content.

The determination of the bandwidth in step 230 of FIG. 7 is expanded in FIG. 9. A given oversample maps to only one possible bandwidth in the CPRI standard recommendations. However, for bandwidth efficiency, some manufacturers are using less samples than recommended. To address those cases, the described implementation relies on machine learning models trained to recognize a specific bandwidth (steps 405 and 410) if the oversample does not map only to one possible bandwidth 400. The best score is selected in step 415. A common example is a 20 MHz signal mapped into six samples. An oversample of 6 is normally used to carry 15 MHz signals.

Figure 10:
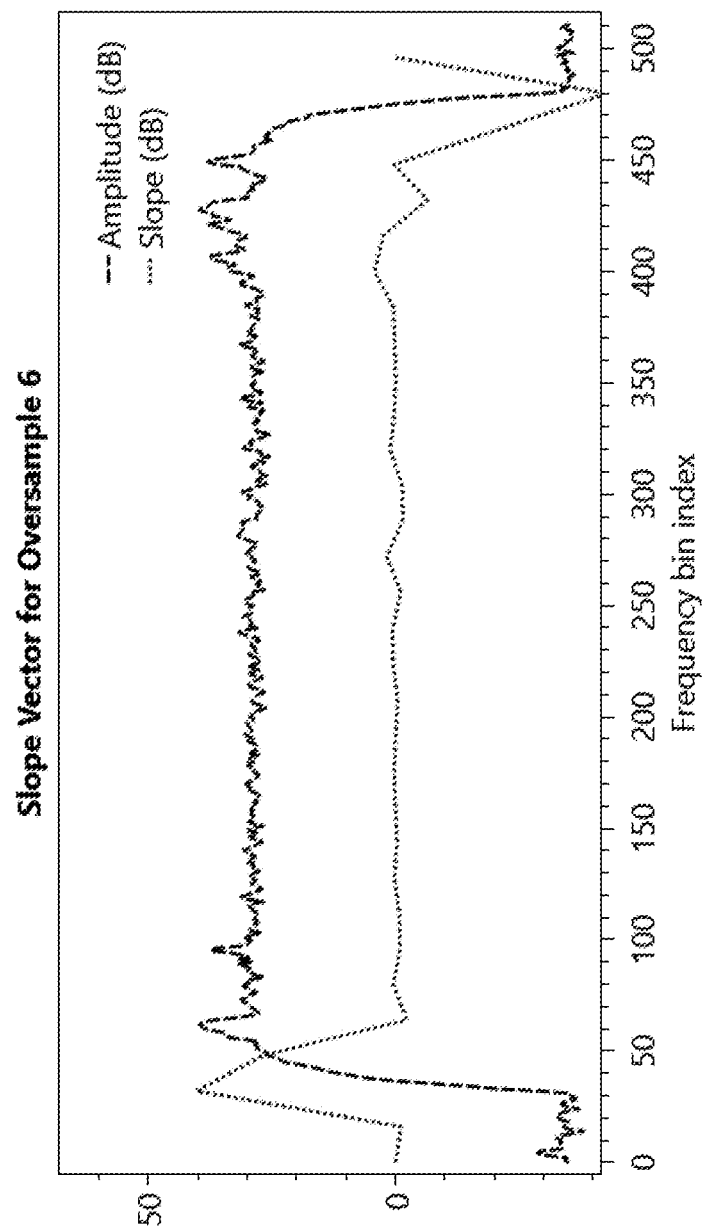
FIG. 10 is a graph showing an example of the spectrum and spectrum slope of 20 MHz signal inserted into an oversample of 6.

Characteristics of a 20 MHz with oversample 6 signal are shown in FIG. 10. The location of the points of inflexion are near the edges of the spectrum. The occupied bandwidth is around 84% compared to 65% for standard bandwidth usage. While the described implementation using machine learning can be trained to recognize training vectors with a larger occupied bandwidth, it is still important to distinguish between a 15 MHz and a 20 MHz content. The implementation uses two additional machine learning models, each trained to their specific bandwidth of 15 MHz and 20 MHz. An alternate solution could use a single classifier machine learning model that would directly identify the bandwidth. However, using scores has the advantage of giving a proportional response to the input and allows comparison of the scores. Other known non-standard combinations which map to a single bandwidth include oversample 3 which maps to 10 MHz and oversample 5 which maps to 20 MHz. These do not require any special processing in step 230.

Referring back to FIG. 7, the AxC containers are filled with samples of a real-time signal. The samples have to be encoded within a certain dynamic range that depends on the chosen mantissa and exponent sizes. To avoid distortion, it is important that RF equipment maintain enough dynamic headroom for the occasional large values of the signal, so most of the encoded values fit in a small part of the dynamic range. The least-significant-bits of the mantissa tend to constantly change. The most-significant-bits change just as frequently because of the zero-crossings of the signal, but many of them change together because of sign extension. As for the exponent, empiric observation on various equipment show that it seldom changes. Because of those characteristics, the analysis of the bit states of the samples in step 210 reveals certain patterns that allow locating sample location and size. The implementation considers two statistics: the vertical and horizontal bit flip rate.

The vertical rate of change, i.e. the rate of change from one frame to the next for each bit position is calculated. The bits in the control word are ignored as they contain protocol information and not data samples. Values equal to or near 0 mean inactive bits. Bits containing antenna data typically have values around 0.5.

The counts of horizontal bit flips are calculated, i.e. for each bit position in the frame, cumulate the number of times it is different from the previous bit position. The horizontal bit flip counts provide information to help determine sample width and encoding.

Figure 11:
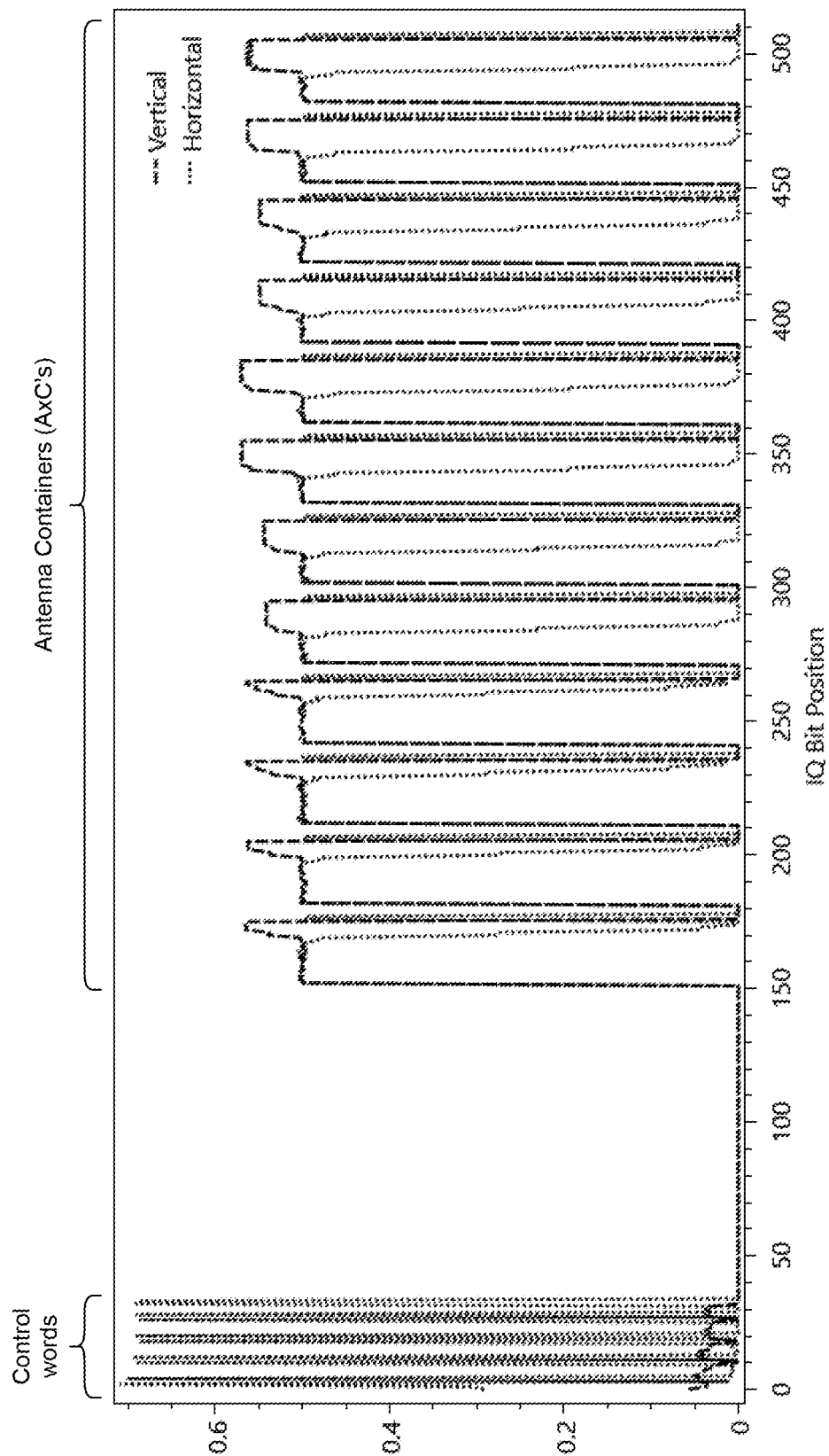
FIG. 11 is an example graph of the horizontal and vertical bit flips measurements made on a CPRI raw capture.

FIG. 11 present a sample of the bit analysis. The control word is visible at the beginning of the frame and the shape of the two bit flip counts appears for several AxC containers at the back of the frame.

At a minimum, the implementation uses non-zero vertical bit flip values to locate active AxCs as in step 215 of FIG. 7. Starting from left to right in the CPRI frame, the algorithm will encounter least-significant bits (LSB) first which provides the starting offset parameter as shown in FIG. 5. Given enough samples, it is highly improbable that the algorithm will be thrown off by an always-zero LSB. To determine the width of the sample, the algorithm can rely on spectrum validation. When spectrum validation fails to identify oversample and encoding, the minimum implementation can use horizontal bit flip rate to skip over samples as is done in step 240 of FIG. 7. A more advanced implementation can also use patterns in vertical and horizontal bit flips to determine sample width.

Another advanced implementation can use the statistical distribution of the sample values to determine additional parameters such as width and encoding without requiring the analysis of the frequency content. Over numerous samples, it is expected the RF signal will yield a distribution close to a normal distribution with an average value of 0. This holds true for each sample, whether it is an oversample of 1 or part of an oversample of 2, 4, 6 or 8. The analysis of the values for a given position in the frames can be used to determine possible candidates from multiple sets of width and encoding parameters. The parameters are used to extract a large number of numerical samples from which different criteria are evaluated. The first criterion is simply the average which is expected to be close to 0 within a certain tolerance. The second criterion is how closely it matches a normal distribution. Typically, standard statistical tests like Shapiro-Wilk test are used for that purpose but tend to be too sensitive over large data sets.

A better method to assess normality in the present system is to build a histogram from the data set, then calculate the mean squared error between the histogram and a normal distribution curve corresponding to the mean and variance of the data set. An arbitrary threshold can be applied to the resulting error measurements. The previous criterion measures how well the histogram maps to a normal distribution curve, but it can be misled by a histogram that fits only the central portion of the curve. Such a fit indicates improper width and/or encoding parameters, or it could imply a high saturation of the RF signal, a highly unlikely situation for a working RF system. To detect this partial fitting, an additional criterion can be considered, for instance the slope of the outer histogram samples. For a normal value spread within the data set, the outer slopes are nearly horizontal.

FIG. 12A shows the distribution of 5000 values of one sample of a real signal using the proper encoding parameters (12 bits mantissa and 3 bits exponent). The histogram in FIG. 12B shows the distribution of the same 5000 values when decoded with 15 bits two's-complement. This trial can be discarded solely based on the average. FIG. 12C shows the result for another trial using a width of 10 bits and no exponent. In this case, both the average and mean-squared-error are not enough to discard the encoding, but the slope of the outer parts of the curve indicates that the encoding is not appropriate.

After having identified, at a minimum, the candidate offset of an active AxC, its other extraction parameters, namely oversample, sample width and encoding, must be identified. For more advanced implementation of bit analysis that provide hints on sample width and encoding. Only the oversample remains to be discovered, although it might be appropriate to re-validate or refine the candidate oversample and width. This is achieved by iterating through the possible combinations in steps 220 and 225 of FIG. 7. A score is attributed to each combination based on how close the resulting signal is to a standard RF signal. Step 220 is the mechanical reconstruction of a candidate time-domain signal.

Figure 13A:
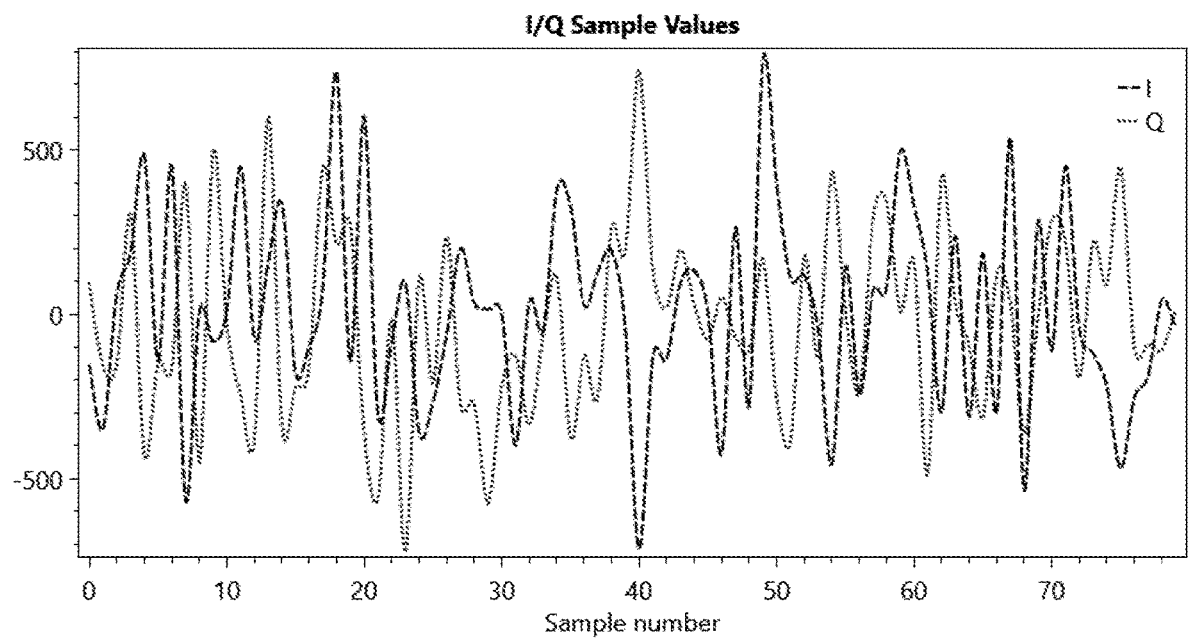
FIG. 13 includes FIG. 13A and FIG. 13B and compares the I and Q time domain samples (FIG. 13A) to the corresponding frequency-domain spectrum (FIG. 13B) for an example data stream.
Figure 13B:
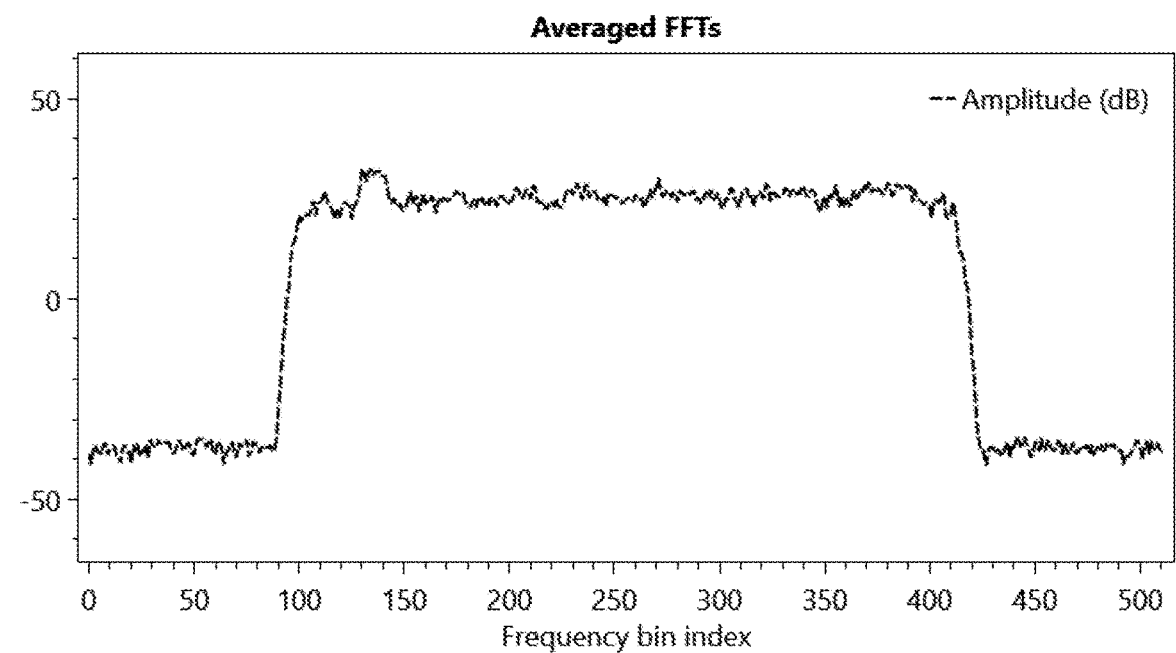

As previously indicated, step 225 is expanded for one possible implementation in FIG. 8. As in many RF applications, the antenna signal is sampled and digitalized in real-time to produce a stream of In-Phase and Quadrature data streams (IQ data). For the purpose of identifying the extraction parameters, the real-time signals themselves are of little use. The frequency content has more significance and is obtained through fast-Fourier-transforms (FFTs). The output of the FFT processing is the amount of power for a range of contiguous frequency bands (aka frequency bins), relative to the sampling frequency. Multiple FFTs are calculated on the reconstructed signals in step 305 and are averaged together in step 310 to establish the mean power per frequency band. The latter operation filters out some of the normal transient signal activity and establishes the baseline power envelope of the signal. FIG. 13 shows the IQ signals in the time domain for a short period of time versus the spectrum that is obtained by averaging multiple FFTs for a longer period of time.

Figure 14:
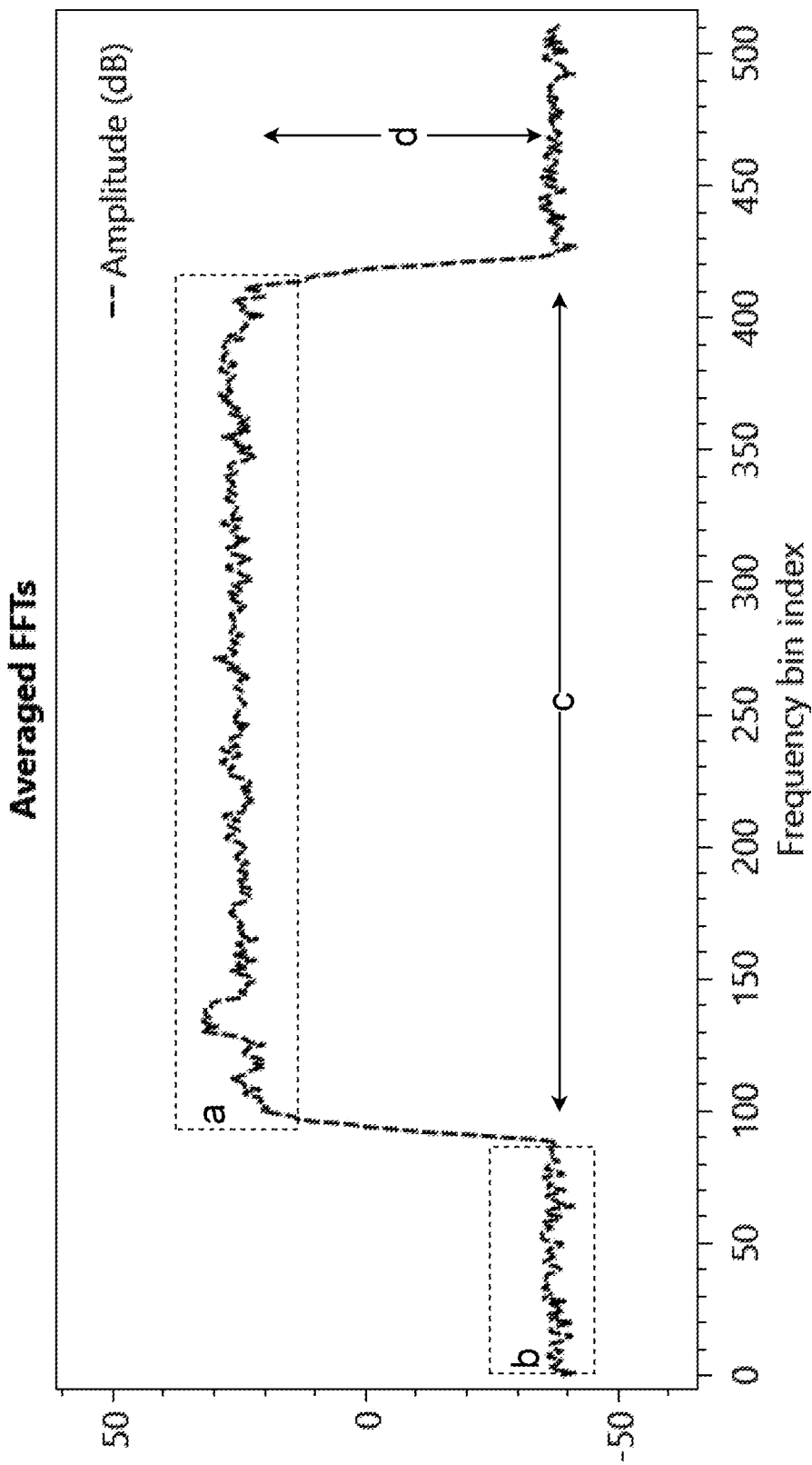
FIG. 14 is a graph highlighting the features of a standard RF spectrum.

For each averaged FFT, its similarity to a standard antenna frequency content is assessed. Refer to FIG. 14 for a representative spectrum of such a signal. The characteristics of the standard antenna signal are: a) relatively flat plateau, small spikes and bumps being acceptable b) relatively flat noise floors on each side c) plateau most commonly occupies around 65% bandwidth but values from 85% up to 95% are possible for certain combinations of extraction parameters d) height of plateau vs noise floor within some expected range.

The antenna signal assessment can be performed in various ways. The described implementation shown in FIG. 8 uses machine learning, but plain algorithmic approaches could be used as well. In one implementation, the "random regression forest" algorithm is used, but neural networks could equally be applied. The machine learning model requires supervised training before it can perform the spectrum validity assessment. The training set can be extracted from real-life samples and it can be supplemented by vectors obtained through simulation. Each sample in the training set is assigned a label indicating whether it is a standard antenna spectrum or an invalid spectrum. The implementation uses a "regression" model that outputs continuous values as opposed to "classification" models that output discrete values. The valid spectrums are assigned a value of 100 and the invalid ones a value of 0. The result is a signal validity score that can be compared to identify the most probable parameter combination.

Figure 15:
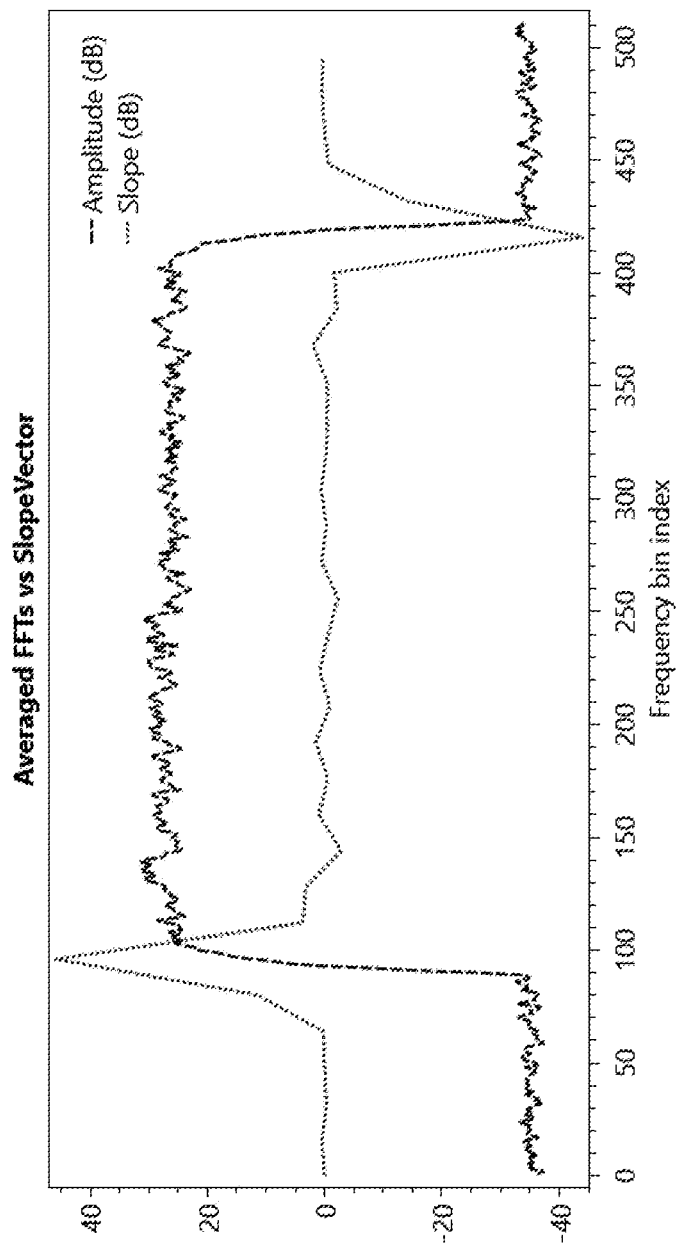
FIG. 15 is a graph showing the relation between spectrum and spectrum slope for an example capture.

To improve learning speed and generalization, the spectrum data is first pre-processed in step 315 of FIG. 8. In one implementation, the size of array of mean power per frequency bands is first reduced through decimation, then the difference is calculated from band to band giving the equivalent of the slope of the decimated spectrum. Using the slope provides normalization of the data around 0 and helps bring out significant features of the spectrum, but other methods of sample pre-processing are not precluded. Refer to FIG. 15 for a comparison of the averaged spectrum to the spectrum slope. As can be seen, the slope is normalized around 0 and shows prominent spikes aligned with the large points of inflexion of the spectrum. Another possible pre-processing implementation is the application of a filtering kernel over the spectrum data. For instance, a derivative of Gaussian DoG kernel acts as a bandpass filter that can be tuned to emphasize the large power changes in the FFT while removing low and high frequency components of the spectrum. Whatever method is used, the goal is to facilitate the training of the AI model and to improve its robustness.

As previously mentioned, some non-standard oversamples can be used to compress more data into the antenna containers. For instance, a 20 MHz signal can be packed into 6 or even 5 samples per frame instead of the standard 8 samples. Another example is using 3 samples instead of 4 for a 10 MHz signal. The pre-processing methods described above for step 315 are in general applicable to those non-standard oversamples; the drop from the plateau to the noise floors simply occurs more closely to the edges of the FFTs. Given a proper training set, the machine learning model can cope with the various bandwidth utilizations. However, for a 20 MHz signal encoded with 5 samples, the power drops are located very close the edges. To support that encoding, it is possible to artificially extend the leftmost and rightmost values of the FFT. For the slope vector pre-processing, this translates into one additional bin on each side of the decimated FFT and two additional values for the slope vector. For the kernel filter method, the leftmost and rightmost values are simply repeated for half the kernel size on each side. In any case, the resulting pre-processing is applicable to other oversamples and is used to train the machine learning model in the same manner.

FIGS. 16A to 16E show examples of spectrums of reconstructed signals using oversamples of 1, 2, 4, 6 and 8. Using an incorrect oversample introduces discontinuities in the time-domain signal that translates into spectrums that do not exhibit the standard characteristics of an RF signal. FIG. 16A shows the score attributed by the machine learning model for the correct parameters, namely oversample of 2 and 12-bit mantissa/3-bit exponent. The graphs for oversample 1, 4, 6 and 8 (FIGS. 16B to 16E) have much lower scores.

The process of extracting the RF signal from the antenna container depends on the encoding of the samples. The CPRI specifications stipulate that the width M of the I/Q samples can be from 4 to 20 bits for uplink and from 8 to 20 bits for downlink. Samples contain a mantissa part of L bits and optionally an exponent part of N bits (where M=N+L). The exponent value is shared between I and Q values and it combines the N-bits exponent part of both for a total width of 2N. The value of N ranges from 0 to M−2 (N=0 case is equivalent to 2's complement encoding). Thus, many combinations of L and N are allowed by the specifications, but in practice only a limited number of combinations are used. For the described machine learning implementation, the training set contains vector using the correct and incorrect encodings. The implementation focuses on 15-bit mantissa/0-bit exponent and 12-bit mantissa/3-bit exponent, designated respectively as 15/0 and 12/3. Other encodings could be supported as well by including correctly-labeled training vectors.

FIG. 16F shows the resulting spectrum and score of a signal encoded as 12/3 and reconstructed using 15/0 extraction parameter. It exhibits an excessively powerful spike at the sampling frequency. Just as for incorrect oversamples, incorrect encodings introduce abnormal characteristics in the calculated spectrum and allow the machine learning model to discriminate the correct parameters.

The algorithm selects the extraction parameters candidate with the best spectrum validity score, provided is it above a configurable threshold. The selected parameters are recorded for this antenna carrier (AxC) and provide the starting point to search for the next AxC location using the bit flip information. The algorithm thus traverses the CPRI frame from left to right to determine the mapping within the frame.

The method described above works well for a limited number of encoding and oversamples, but to support more encoding combinations at the same time as additional non-standard oversamples, a more efficient approach can be used. The improved method combines the analysis of the statistical distribution of the sampled values, as outlined earlier, and the analysis of the FFT spectrum. The encodings that do not exhibit a proper normal distribution are first discarded. The CPU-expensive spectrum analysis is then run only on the remaining encodings.

Figure 17:
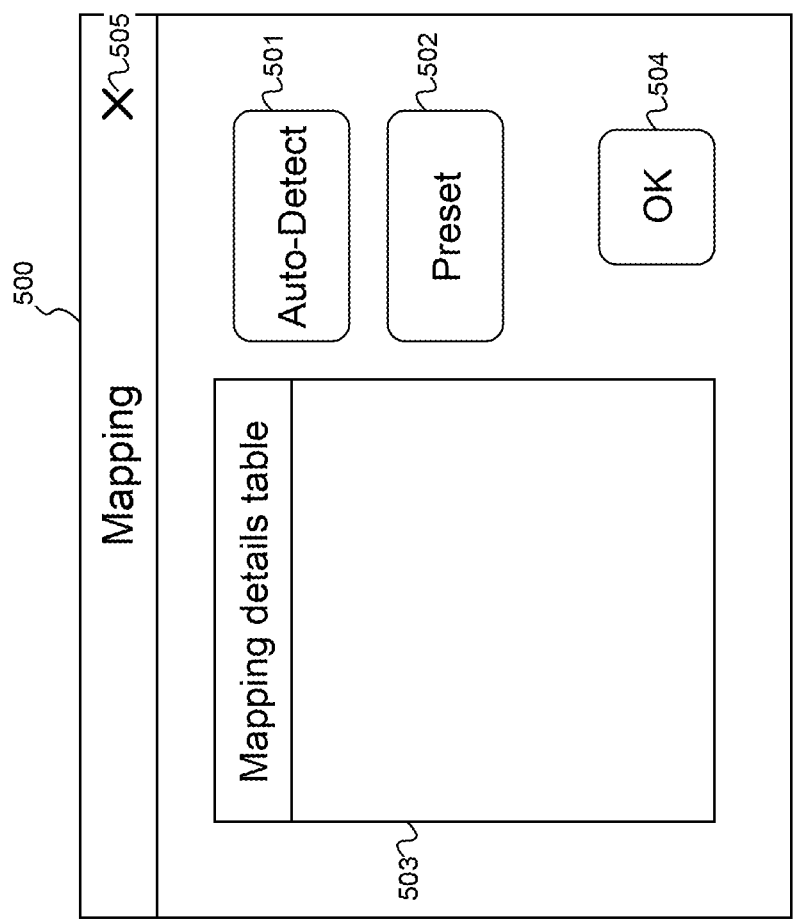
FIG. 17 shows an example screen of a graphical user interface (GUI) for reporting the observed mapping to a user and for interacting with the processing subsystem.

FIG. 17 is a diagram of the mapping configuration pop-up 500 of a Graphical User Interface (GUI). The mapping details table 503 lists the currently configured antenna containers. The user can launch the auto-detection process by pressing the auto-detect button 501. This button is only available when the CPRI link is established. Upon pressing auto-detect button 501, the pop-up will instruct the user to wait for completion and the auto-detection algorithm 112 will start performing steps 205 to 250 in FIG. 7. Upon successful or partial auto-detection of the mapping, the pop-up will update the mapping details table 503. The user can then choose to apply the newly discovered mapping by pressing the OK button 504 or preserve the current configuration by closing the pop-up using the X button 505. When the auto-detection process has not been able to identify any antenna containers, the user is informed of the failure and the mapping details table 503 is not updated. In that case, the user's only choice is to preserve the current configuration. Note that the ability to use pre-defined mappings is offered. Pressing the Preset button 502 opens a list of available mappings that the user can select.

Figure 18:
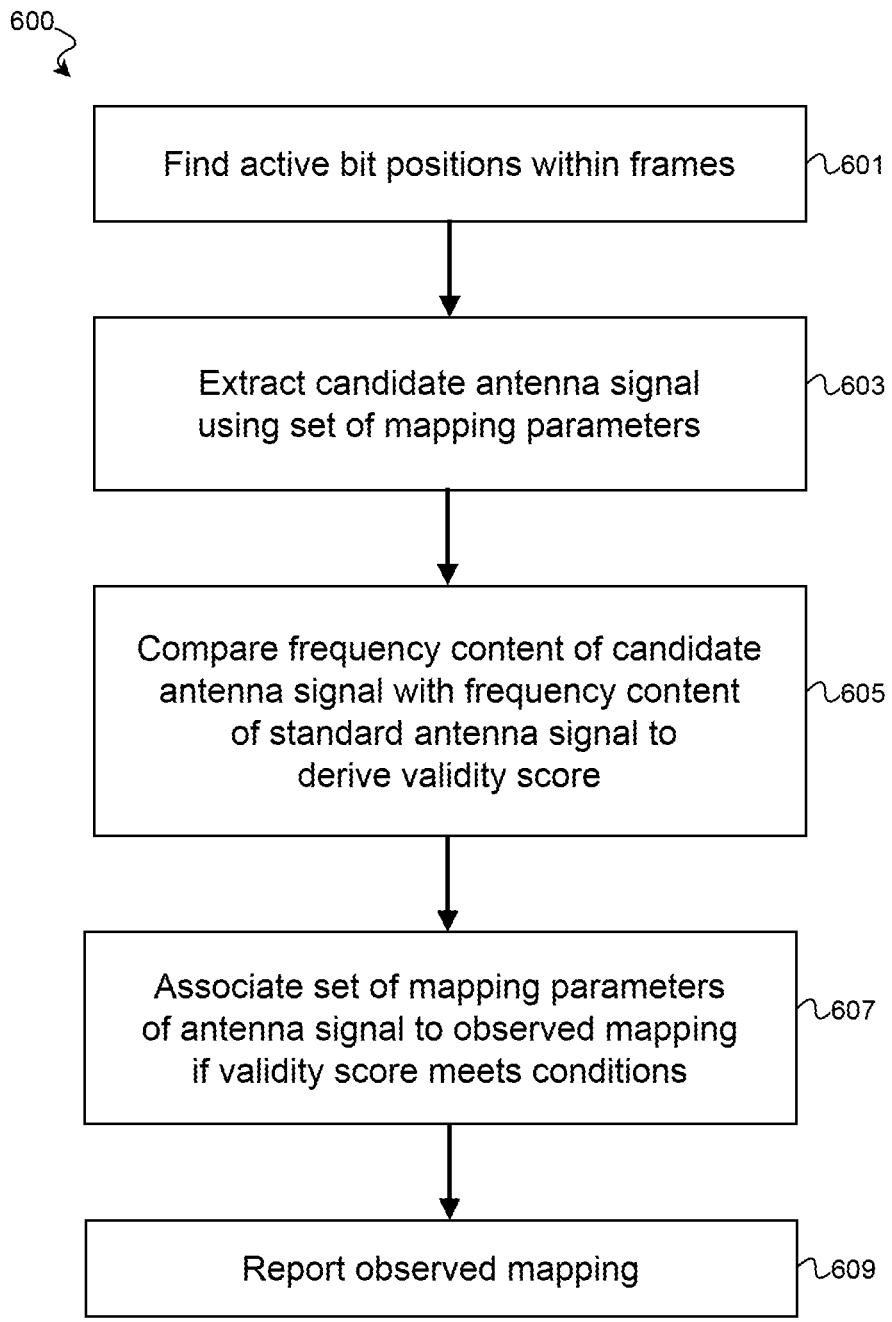
FIG. 18 is a flow chart of example main steps of a simplified method for the auto detection of the CPRI mapping.

FIG. 18 is a flow chart of example main steps of a simplified method for the auto detection of the CPRI mapping. Method 600 provides an observed mapping of antenna data into antenna containers within a common public radio interface (CPRI) signal. The CPRI signal is exchanged between a radio equipment controller (REC) and at least one radio equipment (RE). The CPRI signal is acquired and provided as multiple CPRI basic frames by a capture engine. Method 600 comprises finding a location of activity within the multiple CPRI basic frames in step 601, extracting a candidate antenna signal from the multiple CPRI basic frames starting from the location using a set of mapping parameters used in a standard antenna signal at step 603, comparing a candidate frequency content of the candidate antenna signal to a standard frequency content of the standard antenna signal to derive a validity score at step 605, associating the set of mapping parameters of the standard antenna signal to the observed mapping if the validity score meets predetermined conditions at step 607 and causing a report of the observed mapping at step 609.

The skilled reader will readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein the instructions perform some or all of the steps of the above-described methods. The embodiments are also intended to cover computers programmed to perform the steps of the above-described methods.

It should be appreciated by those skilled in the art that any block diagrams herein represent conceptual views of illustrative circuitry embodying the principles disclosed herein. Similarly, it will be appreciated that any flow charts and scripts and the like represent various processes which may be substantially represented in computer readable medium and so executed by a computer or processor, whether or not such computer or processor is explicitly shown.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

Although various embodiments and examples have been presented, this was for purposes of description, but should not be limiting. Various modifications and enhancements will become apparent to those of ordinary skill in the art.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Any feature of any embodiment discussed herein may be combined with any feature of any other embodiment discussed herein in some examples of implementation.

The invention claimed is:

1. A method for providing an observed mapping of antenna data into antenna containers within a common public radio interface (CPRI) signal exchanged between a radio equipment controller (REC) and at least one radio equipment (RE), said CPRI signal being acquired and provided as multiple CPRI basic frames by a capture engine, the method comprising:
   finding a location of activity within said multiple CPRI basic frames;
   extracting a candidate antenna signal from said multiple CPRI basic frames starting from said location using a set of mapping parameters used in a standard antenna signal;
   comparing a candidate frequency content of said candidate antenna signal to a standard frequency content of said standard antenna signal to derive a validity score;
   associating said set of mapping parameters of said standard antenna signal to said observed mapping if said validity score meets predetermined conditions; and
   causing a report of said observed mapping.

2. The method as claimed in claim 1, wherein said steps of extracting and comparing are repeated for a plurality of different sets of mapping parameters and corresponding ones of said standard antenna signal to derive a plurality of validity scores, and wherein said associating comprises choosing a highest validity score among said plurality of validity scores and determining a chosen set of mapping parameters corresponding to said highest validity score for said observed mapping.

3. The method as claimed in claim 1, wherein said predetermined conditions include a minimum threshold for said validity score.

4. The method as claimed in claim 1, wherein said finding said location of activity comprises calculating bit state statistics on said multiple CPRI basic frames to identify said location.

5. The method as claimed in claim 2, wherein said predetermined conditions include a minimum threshold for said validity score and further comprising calculating bit state statistics on said multiple CPRI basic frames when said highest validity score is below said minimum threshold for said validity score to identify a next starting location for said finding said location.

6. The method as claimed in claim 1, wherein said parameters are a sample width, an offset, an encoding and an oversample wherein said sample width is a number of bits per sample, said offset is a location of data within said basic CPRI frames, said encoding is a transformation of numeric values into bits and said oversample is a number of samples per CPRI basic frame.

7. The method as claimed in claim 6, wherein said encoding is one of 2's complement encoding and mantissa/exponent encoding.

8. The method as claimed in claim 1, wherein said comparing comprises calculating multiple FFTs on said candidate frequency content, calculating an average FFT from said multiple FFTs, calculating an input vector by preprocessing said average FFT and derive said validity score by inputting said input vector into a machine learning model trained to recognize proper frequency content.

9. The method as claimed in claim 8, wherein said input vector is a slope vector.

10. The method as claimed in claim 1, wherein said associating said set of mapping parameters further comprises determining a bandwidth for said candidate antenna signal, wherein said bandwidth is related to said standard frequency content of said standard antenna signal.

11. The method as claimed in claim 10, wherein, said associating said set of mapping parameters comprises assessing a similarity to a first bandwidth signal and determining a first bandwidth score, assessing a similarity to a second bandwidth signal and determining a second bandwidth score, selecting a highest scoring similarity assessment between said first bandwidth score and said second bandwidth score to determine said bandwidth.

12. A non-transitory computer-readable storage medium having computer readable code stored thereon for programming a test system to perform the steps of:
   finding a location of activity within multiple CPRI basic frames;

extracting a candidate antenna signal from said multiple CPRI basic frames starting from said location using a set of mapping parameters used in a standard antenna signal;

comparing a candidate frequency content of said candidate antenna signal to a standard frequency content of said standard antenna signal to derive a validity score;

associating said set of mapping parameters of said standard antenna signal to an observed mapping if said validity score meets predetermined conditions; and causing a report of said observed mapping.

13. A mapping detection device configured to provide an observed mapping of antenna data into antenna containers within a common public radio interface (CPRI) signal exchanged between a radio equipment controller (REC) and at least one radio equipment (RE), said CPRI signal being acquired and provided as multiple CPRI basic frames, the device comprising:

an auto-detection module for
finding a location of activity within said multiple CPRI basic frames;
extracting a candidate antenna signal from said multiple CPRI basic frames starting from said location using a set of mapping parameters used in a standard antenna signal;
comparing a candidate frequency content of said candidate antenna signal to a standard frequency content of said standard antenna signal to derive a validity score;
associating said set of mapping parameters of said standard antenna signal to said observed mapping if said validity score meets predetermined conditions;

a mapping memory for storing said observed mapping of said antenna data into said antenna containers; and
a user interface to report said observed mapping.

14. A mapping detection test system configured to provide an observed mapping of antenna data into antenna containers within a common public radio interface (CPRI) signal exchanged between a radio equipment controller (REC) and at least one radio equipment (RE) said CPRI signal being acquired and provided as multiple CPRI basic frames, the test system comprising:

a user interface;

a processor; and memory storing instructions that, when executed, cause the processor to find a location of activity within said multiple CPRI basic frames;
extract a candidate antenna signal from said multiple CPRI basic frames starting from said location using a set of mapping parameters used in a standard antenna signal;
compare a candidate frequency content of said candidate antenna signal to a standard frequency content of said standard antenna signal to derive a validity score;
associate said set of mapping parameters of said standard antenna signal to said observed mapping if said validity score meets predetermined conditions; and
cause a report of said observed mapping on said user interface.

* * * * *